(No Model.)
G. W. KNAPP.
HANDLE FOR TEA OR COFFEE POTS.
No. 442,900. Patented Dec. 16, 1890.
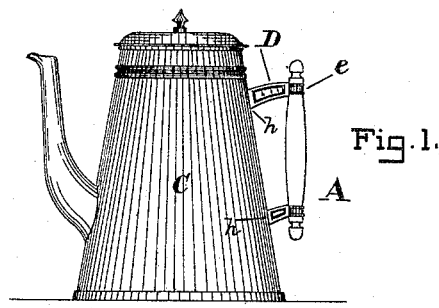
Fig. 1.
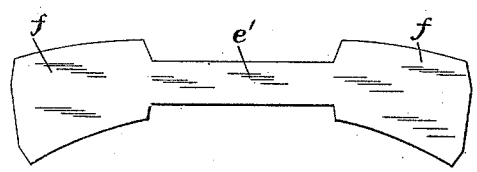
Fig. 2.
Fig. 3.
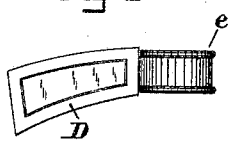
Fig. 5.
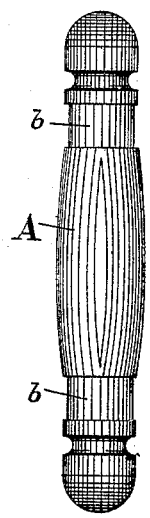
Fig. 6.
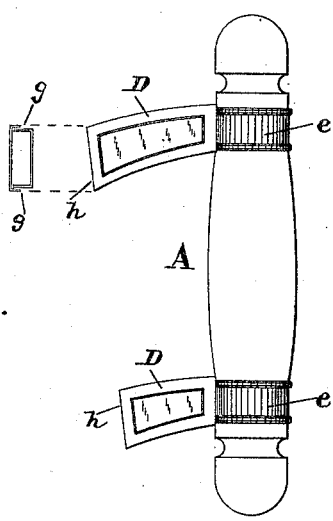
Fig. 4.
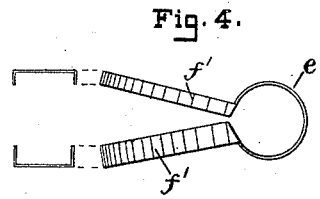
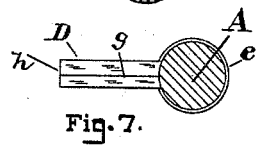
Fig. 7.
WITNESSES:
Otto H. Ehlers.
John E. Morris.
INVENTOR:
G. W. Knapp
BY Chas. B. Mann
ATTORNEY.

UNITED STATES PATENT OFFICE.

GEORGE W. KNAPP, OF BALTIMORE, MARYLAND.

HANDLE FOR TEA OR COFFEE POTS.

SPECIFICATION forming part of Letters Patent No. 442,900, dated December 16, 1890.

Application filed May 20, 1890. Serial No. 352,457. (No model.)

*To all whom it may concern:*

Be it known that I, GEORGE W. KNAPP, a citizen of the United States, residing at Baltimore, in the State of Maryland, have invented certain new and useful Improvements in Handles for Tea or Coffee Pots, of which the following is a specification.

My invention relates to a handle for tea and coffee pots or other vessels; and it consists of a hand-grasp part of wood or other non-conductor of heat and metal pieces which encircle said hand-grasp part and connect it with the body of the vessel.

The invention is shown in the drawings.

Figure 1 is a view of a pot with the improved handle. Fig. 2 is a view of a blank of sheet metal from which the connecting part is made. Figs. 3 and 4 are two views of the said metal connection. Fig. 5 is a view of the hand-grasp part of the handle, made of some non-conductor of heat. Fig. 6 is a view of the complete handle separate, showing it ready for attachment to a vessel. Fig. 7 is a view of the hand-grasp in section and the metal connection.

The letter A designates the hand-grasp part of the handle, which is made of wood, hard rubber, or some other material that is a poor conductor of heat. This grasp part has two necks or reduced portions $b$, one near each end. The particular design or shape of the handle part A is immaterial.

The hand-grasp part A is attached to the vessel C by two metal connections D, each of which has a ring or loop $e$, that encircles the said hand-grasp. One form of construction for the loop-metal connection is illustrated in the drawings. Fig. 2 shows the form of a sheet-metal blank from which the "connection" is made. The narrow central part $e'$ of the blank forms the ring or loop that encircles the hand-grasp, and the two broad ends $f$ together form the part D, that reaches or projects from the hand-grasp to the vessel. The blank is put in a die and the broad ends $f$ shaped up, as shown. The two opposite edges of both edges are turned to form flanges $f'$, then the narrow central part $e'$ is bent around a suitable tool to form the ring or loop $e$. One of these metal connections are then looped about each of the necks $b$ of the hand-grasp and the flanges $f'$ of the two ends are brought together so as to overlap, and are soldered at $g$. Thus the finished handle comprises a wood hand-grasp A and two laterally-projecting metal connections D, each having a ring or loop which encircles it.

The invention is not limited to making the metal connections of sheet metal.

To attach the handle to the vessel, it is only necessary to apply solder at the point $h$, where the ends of the metal connections come in contact with the vessel.

Having described my invention, I claim—

A handle for tea and coffee pots and other vessels, comprising a hand-grasp part A, of wood or other poor heat-conductor, and two connections D, each consisting of a strip of metal doubled upon itself to form a loop for encircling the hand-grasp, and having its ends provided with flanges, the flanges of one end overlapping those of the other and secured together and adapted to be secured to the side of the vessel, substantially as described.

In testimony whereof I affix my signature in the presence of two witnesses.

GEORGE W. KNAPP.

Witnesses:
JOHN E. MORRIS,
JNO. T. MADDOX.